United States Patent Office 3,480,638
Patented Nov. 25, 1969

3,480,638
DERIVATIVES OF 5-HYDROXYALKYL-6,7-BENZOMORPHANS
Fred B. Block, Hartsdale, and Frank H. Clarke, Jr., Armonk, N.Y., assignors to Geigy Chemical Corporation, Greenburgh, N.Y., a corporation of Delaware
No Drawing. Continuation of application Ser. No. 435,359, Feb. 25, 1965. This application Nov. 10, 1966, Ser. No. 593,582
Int. Cl. C07d 29/24
U.S. Cl. 260—294.3                    24 Claims

ABSTRACT OF THE DISCLOSURE 5-hydroxyalkyl - 6,7 - benzomorphans and esters and ethers thereof are analgesic agents.

CROSS REFERENCE

This is a continuation of Ser. No. 435,359 filed Feb. 25, 1965, now abandoned which in turn is a continuation-in-part of Ser. No. 332,296, filed Dec. 20, 1963, now abandoned.

DETAILED DESCRIPTION

This invention pertains to 6,7-benzomorphans having in the 5-position a hydroxyalkyl group, or the etherified or esterified derivatives thereof. These compounds are represented by the formula:

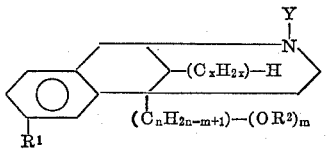

in which $n$ has a value of from 1 to 6,
$m$ has a value of 1 or 2,
$x$ has a value of from 0 to 6,
$R^1$ is hydrogen or the group —$OR^3$,
each of $R^2$ and $R^3$ is independently (lower) alkanoyl or the group —$(C_pH_{2p})$—H, in which $p$ has a value of from 0 to 6, and
Y is hydrogen, (lower)alkyl, (lower)alkenyl, halo-(lower)alkenyl, (lower)alkynyl, or Z-(lower) alkylene in which Z is hydroxy, amino, (lower)alkanoyloxy, cycloalkyl, phenyl, halophenyl, aminophenyl, nitrophenyl, (lower)alkoxyphenyl or hydroxyphenyl.

By the term "(lower)alkyl" and derivations thereof, such as "(lower)alkoxy," "(lower)alkenyl," "(lower)alkynyl," "(lower)alkanoyloxy" and the like, when used in this specification and the appended claims, is intended a branched or straight hydrocarbon chain containing from one to six carbon atoms. Representative of such (lower) alkyl groups are thus methyl, ethyl, propyl, isopropyl, butyl, sec.-butyl, t-butyl, pentyl, isopentyl, hexyl and the like. Representative of such (lower)alkoxy groups are the methoxy, ethoxy, propoxy, i-propoxy, butoxy and the like. It is to be understood that when the nature of any particular functional group in these moieties requires at least two carbon atoms, such as the olefinic bond in a (lower)alkenyl group, the hydrocarbon chain will contain at least two carbon atoms.

The compounds of the present invention are characterized chemically by the presence in the 5-position of a hydrocarbon group of from 1 to 6 carbon atoms which is substituted by one or more hydroxy groups or by the alkyl ether or alkanoic acid ester derivatives thereof. Among the various groups which may thus be present in the 5-position are alkoxyalkyl, hydroxyalkyl, alkanoyloxyalkyl, di(hydroxy)alkyl, di(alkoxy)alkyl, di(alkanoyloxy)alkyl and the like. The preferred embodiment is represented by benzomorphans having an alkoxyalkyl group in the 5-position, particularly β-methoxyethyl.

The 2'-position of these novel benzomorphans may be unsubstituted, or substituted by a hydroxy group or an alkyl ether or alkyl ester derivative of a hydroxy group.

The 9-position of the compounds of this invention may be unsubstituted or substituted by an alkyl group of from 1 to 6 carbon atoms, preferably methyl. This alkyl group may be in either the α and β configuration and both forms are included within the scope of this invention.

The ring nitrogen atom, designated as the 2-position, may be unsubstituted or substituted by a wide variety of groups. Among the substituents which may constitute Y are (lower)alkyl, (lower)alkenyl, (lower)alkynyl, halo (lower)alkenyl including mono and polyhalo(lower)alkenyl, and substituted (lower)alkyl. The substituents which may be present on such substituted (lower)alkyl groups include cycloalkyl of from 3 to 5 carbon atoms, amino including mono and dialkylamino, hydroxy including alkanoylated and alkylated derivatives thereof, and phenyl including the mono and polysubstituted derivatives thereof such as halophenyl, nitrophenyl, aminophenyl, alkoxyphenyl, hydroxyphenyl and the like. These substituted alkyl derivatives are herein designated Z-(lower)alkylene where Z represents the above substituents.

The compounds of this invention are non-toxic analgesics having activities of the same order of magnitude as that of morphine.

The compounds of the present invention may be administered parenterally or orally in any of the usual pharmaceutical forms including, without limitation, tablets, capsules, powders, suspensions, solutions, syrups and the like. One particularly useful formulation is that of a sustained released preparation which may be compounded according to any of the many known procedures.

The compounds of this invention all possess a basic nitrogen atom in the fundamental nucleus and hence a wide variety of acid addition salts are possible. Since the analgesic properties of these compounds are a manifestation of the novel benzomorphan structure and not the particular salt formation, the nature of these salts is limited only by their pharmacological utility, namely that the salts by non-toxic and physiologically acceptable. Typical salts thus include those obtained from organic and inorganic acids such as hydrochloric, hydrobromic, sulfuric, phosphoric, methanesulfonic, acetic, lactic, succinic, malic, aconitic, phthalic, tartaric, embonic and the like.

The compounds of this invention may exist as at least two optical isomers since the presence of an "asymmetric" carbon atom in the benzomorphan nucleus results in the existence of d- and l- forms. In addition, when there is an alkyl group in the 9-position, as represented by $x$ having a value greater than zero, stereoisomers are possible, the alkyl group being in either the α or β position. Still further isomeric forms may exist if the groups in the 2 and/or 5 position lack planes of symmetry. In each instance, however, the geometric and/or stereoisomers may be separated, is desired, by utilizing differences in their physical properties, e.g., by fractional crystallization or distillation. When it is desirable to resolve enantiomorphs, the formation of diastereoisometric salts through the use of optically active acids such as mandelic acid should be employed. All such isometric forms are within the purview of this invention, including the d- and l- forms of each of the α and β forms when an alkyl group is in the 9-position.

The compounds of the present invention may be prepared from various other benzomorphans or in some cases may be prepared directly through cyclization. Thus in the latter case, a compound of Formula II is treated with a strong mineral acid or Lewis acid, to yield a compound of Formula III:

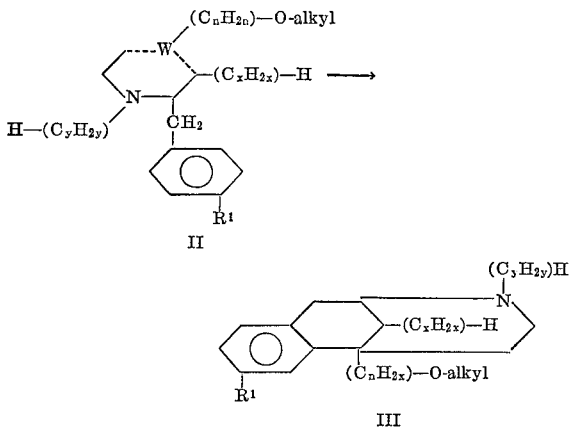

In the above expression, $n$ and $x$ have the previously given values and $R^1$ is as above defined but preferably hydrogen or alkoxy. The symbol $y$ has a value of from 0 to 6 but is preferably 1, e.g. the nitrogen is substituted by a methyl group. W is a carbon-hydrogen system, embracing the 3, 4 and 5 position of pyridine ring, capable of forming a carbonium ion on the carbon atom *para* to the nitrogen atom. Representative of such systems in the environment of the pyridine ring are the following, of which IIa is preferred.

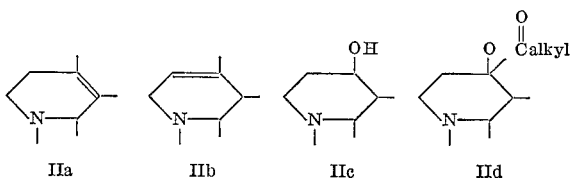

Suitable agents for the above-described cyclization include phosphoric acid, sulfuric acid, hydrobromic acid, aluminum chloride, zinc chloride, titatnium chloride, iron chloride, boron trifluoride, aluminum bromide and the like. To minimize cleavage of the alkoxy group in the 5-position and that in the 2'-position, if one is there present, aluminum tribromide is the preferred cyclization agent. By utilizing the differences in reactivity between the alkoxy group in the 2'-position of the aromatic nucleus and the alkoxy group on the alkyl group in the 5-position, the former can be selectively cleaved, as with pryidine hydrochloride, after cyclization to a hydroxy group. Alternatively a hydroxy group can be introduced in the 2'-position through nitration of a compound where $R^1$ is hydrogen, followed by reduction of the nitro group to an amino group, dazotization and hydrolysis. Such hydroxy groups may be esterified, as by the use of an alkanoic acid anhydride, e.g. acetic anhydride, or etherified as by the use of a diazoalkane, e.g. diazomethane.

The alkylene chain in the 5-position of these benzomorphans, represented by $-(C_nH_{2n-m+1})-$ in Formula I, may be straight or branched. The hydroxy group is preferably a primary hydroxy group, and thus terminal, but can be bound to any carbon atom of the chain, thus including secondary and tertiary hydroxy groups as well. The alkoxy and alkanoyloxy derivatives of these hydroxy groups will bear the same relationship as the hydroxy group from which it is derived, bearing in mind that in some instances, the highly hindered nature of some tertiary hydroxy structures may hamper alkylation or alkanoylation.

Compounds of this invention bearing a hydroxyalkyl group in which the hydroxy group is primary may be obtained from the corresponding 5-alkoxyalkyl benzomorphan through treatment with hydrogen bromide, followed by hydrolysis. This may be typified by the following in which "B" is the benzomorphan residue.

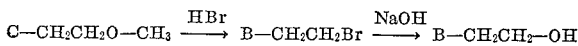

In addition, carbon atom increments of one can be made in the alkylene chain through the action of sodium cyanide on a 5-haloalkyl benzomorphan and subsequent hydrolysis or by use of carbon dioxide on a Grignard derivative, followed in both instances by reduction. Typical examples of these reactions are as follows:

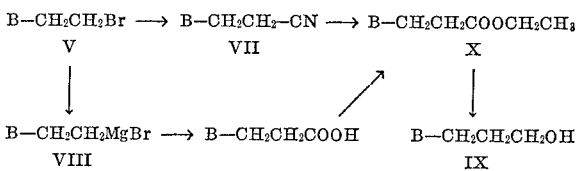

By converting the resulting alcohol, such as XI, to the corresponding bromide, the above sequence can be repeated.

Carbon atom increments of two can be made in the alkylene chain by the action of ethylene oxide on a Grignard derivative, as shown by the following example

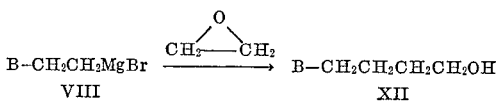

Compounds of this invention bearing a secondary hydroxyalkyl group in the 5-position may be obtained through the action of an alkyl magnesium halide on a benzomorphan having an alkylaldehyde group in the 5-position. The requisite aldehyde may be obtained, for example, by controlled oxidation of the corresponding primary alcohol. This may be typified by the following:

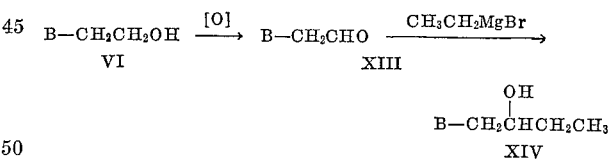

Alternatively a 5 - cyanoalkylbenzomorphan may be treated with an alkyl magnesium halide and the resulting ketone then reduced to yield the secondary hydroxyalkyl compound. A typical example of this is the following:

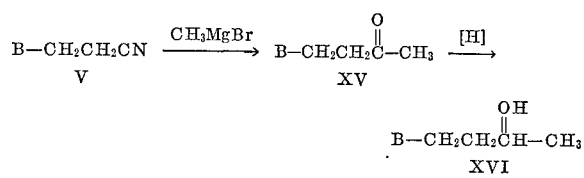

Compounds having a tertiary hydroxyalkyl group may be prepared by treating a benzomorphan having an ester function in 5-position with an alkyl magnesium halide, of which the following is one example

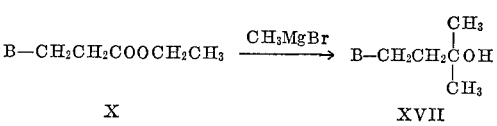

The alkyl group in the 5-position may also be substituted by two hydroxy groups, as when m=2, or by the esterified and/or etherified derivatives thereof. When the hydroxy groups desired are to be vicinal, the compound may be prepared from a bromo ketone followed by reduction. Typical of this is the following:

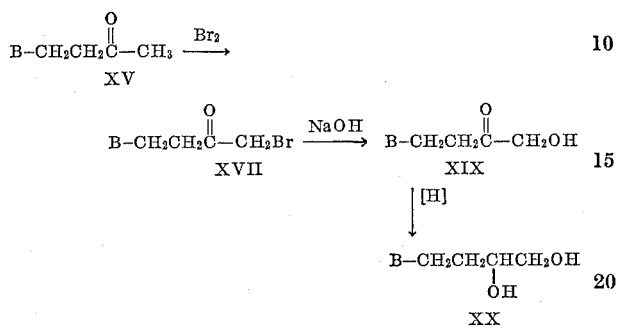

Dihydroxyalkyl compounds in which the hydroxy groups are not vicinal may be prepared by treating a 5 cyano or 5 - cyanoalkylbenzomorphan with an alkoxyalkylmagnesium halide, followed by reduction of the ketone thus obtained and, if desired, cleavage of the alkoxy group:

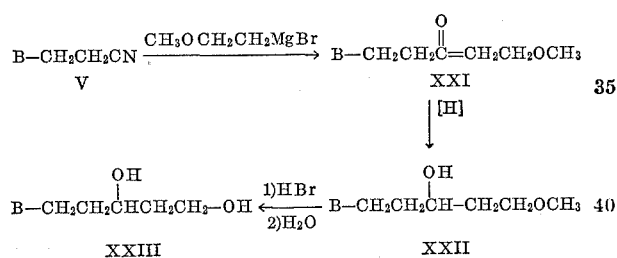

This route may also be used to prepare compounds having vicinal hydroxy groups through use of an alkoxymethyl Grignard reagent, such as ethoxymethyl magnesium halide.

While specific alkyl and alkylene groups have been shown in Formulae IV through XXIII it is to be understood that these are merely representative and that analogous synthetic routes are suitable to obtain other alkyl or alkylene groups.

The hydroxyalkyl or dihydroxyalkyl group in the 5-position of these novel benzomorphans may be further modified by esterification, as with an alkanoic acid anhydride or chloride, or by etherification, as by reacting the sodium salt with an alkyl halide.

While in some instances the group desired as the substituent Y must be present during the cyclization described above, it is generally preferable to introduce the same after cyclization and after executing such transformations of the substituent in the 5-position as desired. Hence when Y is (lower)alkyl, such as methyl, or an inert substituted alkyl group, such as phenethyl, it may be introduced on the nitrogen atom of the hydrogenated pyridine starting material of Formula II. When Y is to be some group which can be adversely affected by the reaction condition for modifications elsewhere in the molecule, it is desirable to effect cyclization with a compound in which Y is methyl and at a subsequent stage introduce the desired Y group. Thus a 2 - methylbenzomorphan is converted to the corresponding 2 - desmethylbenzomorphan by treatment with a slight molar excess of cyanogen bromide to form the corresponding 2-cyanobenzomorphan which is then reduced with lithium aluminum bromide or hydrolysed with a strong mineral acid:

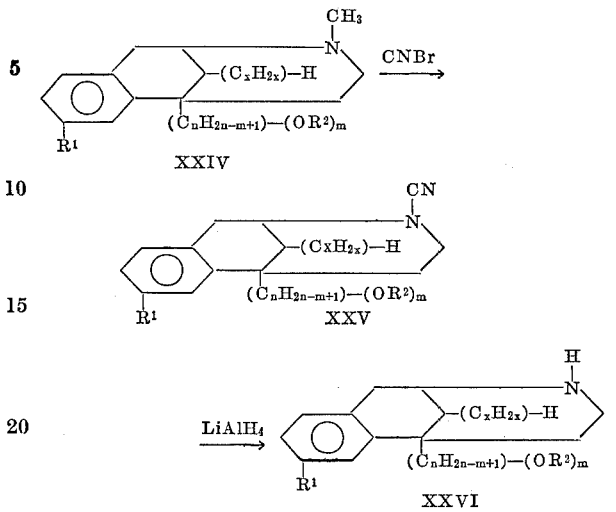

Compounds of Formula XXVI above are thus particularly valuable since by the application of various procedures, it is possible to introduce a wide variety of substituents in the 2-position of the benzomorphan nucleus. For example treatment with an alkenyl, alkynyl, alkyl, or phenylalkyl halide in the presence of an acid binding agent such as an alkali bicarbonate yields compounds wherein Y is alkenyl, alkynyl, alkyl, or phenylalkyl respectively.

Alternatively alkyl or substituted alkyl groups may be introduced in the 2-position by use of an acyl reagent followed by reduction of the amide thus formed. Thus, for example, a compound of Formula XXVI is treated with cyclopropylcarboxyl chloride to yield the corresponding 2-cyclopropylcarboxybenzomorphan which upon reduction forms the 2-cyclopropylmethyl derivative.

When an alkyl group is desired in the 9-position, intermediates of Formula II possessing such a group are used. Such intermediates may be obtained for example from the appropriate pyridine as the methiodide through the action of a benzyl-magnesium halide, followed by reduction with sodium borohydride. Many of the requisite pyridines are known; those which are new may be prepared via known procedures, e.g. the condensation of mixed aldehydes and ammonia. These reactions may be typified as follows:

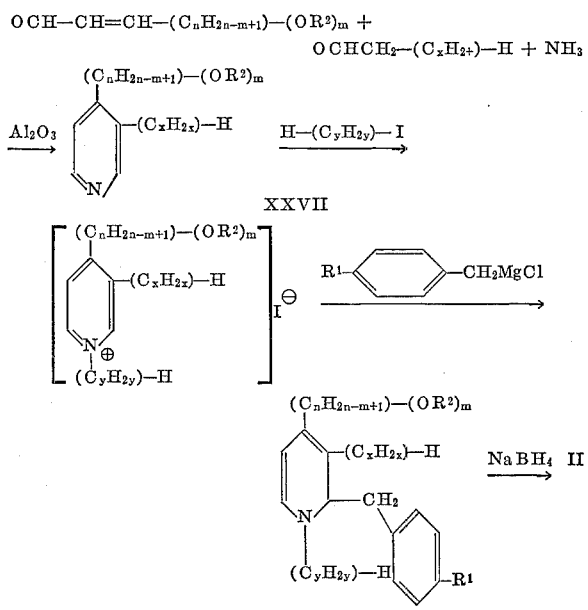

In the above sequence, $m$ preferably has the value of 1, $R^2$ is preferably a (lower)alkyl group, $R_1$ is preferably hydrogen or (lower)alkoxy and $y$ preferably has a value of 1. Modification on the benzomorphans obtained upon cyclization may then be effected as described above.

The following examples will serve to further typify the nature of this invention but should not be construed as a limitation thereof.

Example 1.—2-methyl-5-(β-methoxyethyl)-6,7-benzomorphan hydrochloride (a) 4-(β-methoxyethyl)pyridine methiodide.—Methyl iodide, (313 g., 137 ml., 2.20 mole) is added dropwise with stirring to a solution of 274 g. (2.00 mole) of 4-(β-methoxyethyl)pyridine in 400 ml. of acetone and 200 ml. of benzene at such a rate that reflux is maintained. The stirring is continued for 3 hours while the reaction mixture is allowed to cool to room temperature. After refrigeration, overnight, the product is collected, recrystallized from acetone and dried, M.P. 75–78° C.

Calc. for $C_{19}H_{14}INO$: C, 38.73; H, 5.06. Found: C, 38.72; H, 5.06.

(b) 1-methyl-4-(β-methoxyethyl)-1,2,5,6-tetrahydropyridine.—A solution of 223 g. (0.80 mole) of 4-(β-methoxyethyl)pyridine methiodide in 320 ml. of water and 320 ml. of methanol is added dropwise with stirring to a solution of 50 g. (1.3 moles) of sodium borohydride in 240 ml. of water at such a rate that the temperature is maintained at from 50 to 60° C. An additional 44 g. of solid sodium borohydride are then added and stirring at room temperature is continued overnight. The solution is then filtered and concentrated in vacuo to about one-third its volume. The solution is next extracted with ether several times and the ether extracts washed with saturated aqueous sodium sulfate, dried over sodium sulfate and evaporated. The residue is distilled to yield the product, B.P. 90–92° C./12 mm.

(c) 1-benzyl-1-methyl-4-(β-methoxyethyl)-1,2,5,6-tetrahydropyridinium chloride.—The quaternary salt is prepared by the addition of a 10% mole excess of benzyl chloride to a solution of 7.8 g. of 1-methyl-4-(β-methoxyethyl)-1,2,5,6-tetrahydropyridine in 30 ml. of acetone. After standing at room temperature, the product crystallizes and is collected and recrystallized from acetone, M.P. 134.5–137.5° C.

Calc. for $C_{16}H_{24}ClNO$: Cl, 12.58. Found: Cl, 12.38.

The compound is very hydroscopic.

(d) 1-methyl-2-benzyl-4-(β-methoxyethyl)-1,2,5,6-tetrahydropyridine.—A 2.0 molar solution of phenyl lithium in ether (71.5 ml., 0.143 mole) is added dropwise to a stirred suspension of 35.8 g. of dry 1-benzyl-1-methyl-4-(β-methoxyethyl)-1,2,5,6-tetrahydropyridinium chloride (0.127 mole) in 225 ml. of anhydrous ether at such a rate as to maintain a gentle reflux. Refluxing is continued for 2 hours and the reaction mixture is then cooled and rendered acidic with 100 ml. of 2 N hydrochloric acid. The aqueous layer is separated and rendered basic with conc. ammonium hydroxide, again with ice cooling. The product is extracted with ether, and the extracts are dried over sodium sulfate and evaporated. The product is then distilled, B.P. 128–135° C./.5 mm. The picrate is obtained by the addition of a solution of 20.8 g. (0.091 mole) of picric acid in 200 ml. of ethanol to a solution of 27.2 g. (0.111 mole) of the base in 30 ml. of ethanol. As an oil forms, acetone is added to maintain solution. After standing several days in the refrigerator, the product is isolated and recrystallized from ethanol:acetone, M.P. 100.5–102.5° C. (after drying at 60°/.1 mm. for 3 hours).

Calc. for $C_{22}H_{26}O_8N_4$: C, 55.69; H, 5.52; N, 11.81. Found: C, 55.89; H, 5.60; N, 11.95.

Alternatively 1-methyl-2-benzyl-4-(β-methoxyethyl)-1,2,5,6-tetrahydropyridine is obtained by the following procedure. A solution of 30.0 ml. of benzyl chloride in 100 ml. of ether is added over a 1 hour interval to a stirred, refluxing suspension of 8.0 g. of magnesium turnings and 8.0 g. of magnesium powder in 250 ml. of ether. Refluxing and stirring are continued for 2 hours more and the solution is then filtered through glass wool into an addition funnel and added over a 10 min. interval to a stirred refluxing suspension of 56.0 g. of 4-(β-methoxyethyl)pyridine methiodide in 100 ml. of ether. Refluxing and stirring are continued for 2 hours and the mixture is then added to 150 ml. of a cold, saturated solution of ammonium chloride containing 20 ml. of conc. aqueous ammonia. The ether solution is separated and extracted with a cold aqueous solution containing 20 ml. of conc. hydrochloric acid. The aqueous extracts are rendered alkaline with ammonia and extracted with ether. The ether solution is dried over sodium sulfate and evaporated to yield 2-benzyl-4-(β-methoxyethyl)-1-methyl-1,2-dihydropyridine as an oil. The oil is dissolved in 70 ml. of methanol and, with cooling and stirring, 6.0 g. of sodium borohydride are added. The solution is refluxed for 1¼ hours and left overnight at room temperature. The methanol is removed in vacuo and the residue shaken with water and ether. The ether solution is dried over sodium sulfate and evaporated. The residue is distilled in vacuo to give a first fraction B.P. 125° C./1 mm. and a second fraction B.P. 150° C./4 mm. The first fraction is redistilled and the distillate used for the cyclization reaction described below.

(e) 2-methyl-5-(β-methoxyethyl)-6,7-benzomorphan hydrochloride.—A solution of the soluble portion of 12.0 g. of aluminum tribromide in 200 ml. of carbon disulfide is added over a 10 minute interval to a solution of 3.0 g. of freshly distilled 1-methyl-2-benzyl-4-(β-methoxyethyl)-1,2,5,6-tetrahydropyridine in 20 ml. of carbon disulfide with stirring and cooling in ice. After 5 minutes, the cooling bath is removed and the mixture heated at reflux for 30 minutes. The mixture is then cooled, the solution decanted and the residue washed with carbon disulfide. The viscous residue is poured over ice and 20 ml. of conc. aqueous ammonia are added. Chloroform is added and the mixture stirred and heated to melt the ice and warm the mixture. The solids are filtered off and washed well with chloroform. The chloroform layer is separated, dried over anhydrous sodium sulfate and evaporated. The residual oil is distilled at 130° C./.05 mm. and the distillate, 2-methyl-5-(β-methoxymethyl)-6,7-benzomorphan, is converted to the hydrochloride salt with hydrogen chloride in ether:acetone. This salt is recrystallized twice from acetone to yield 2-methyl-5-(β-methoxyethyl)-6,7-benzomorphan hydrochloride. M.P. 163–165° C.

Calc. for $C_{16}H_{23}NO \cdot HCl$ (281.84): C, 68.21; H, 8.58; N, 4.97. Found: C, 58.08; H, 8.49; N, 5.05.

Alternatively aluminum chloride is used in place of aluminum bromide as the cyclization reagent.

Example 2.—2′-hydroxy-2-methyl-5-(β-methoxyethyl)-6,7-benzomorphan (a) 2′-nitro-2-methyl-5-(β-methoxyethyl)-6,7-benzomorphan.—To a solution of 5.33 g. (0.022 mole) of 2-methyl-5-(β-methoxyethyl)-6,7-benzomorphan in 20 ml. of glacial acetic acid, chilled to −10° C., is added a mixture of 20 ml. of 90% fuming nitric acid and 15 ml. of glacial acetic acid, also cooled to −10° C. The solution is stirred vigorously, the temperature being maintained below 5° C. during the addition. The solution is then kept at room temperature for 63 hours and poured into 400 ml. of water, the resulting aqueous solution being extracted with 25 ml. of methylene chloride. The aqueous solution is rendered basic with sodium hydroxide solution and extracted with methylene chloride. The organic layer is dried over sodium sulfate and concentrated, leaving a brown oil which forms a picrate melting at 212.5°.

(b) 2′-hydroxy-2-methyl-5-(β-methoxyethyl)-6,7-benzomorphan.—To a solution of 1.96 g. (7.15 mole) of 2′-nitro-2-methyl-5-(β-methoxyethyl)-6,7-benzomorphan (purified by regeneration from the picrate with lithium hydroxide) in a mixture of 80 ml. of ethanol and 10 ml. of 85% aqueous hydrazine hydrate is added a small amount of freshly prepared Raney nickel. The solution froths and gradually lightens in color. The solution is then heated on a steam bath for 30 min., filtered, and concentrated. The residue is dissolved in 50 ml. of 3 N sulfuric acid, the solution cooled to 0° C., and 0.5 g. of sodium nitrite is added in small portions. The solution is kept at 0° C. for 30 min., and then poured into a warm (60° C.) mixture of 40 ml. of sulfuric acid and 40 ml. of water. The resulting solution is heated on the steam bath for 30 min., chilled, and neutralized with concentrated ammonium hydroxide. The resulting suspension is extracted three times with 100 ml. portions of methylene chloride and the combined extracts are dried and concentrated. The residue is dissolved in acetone, passed over a 10 cm. column of alumina and crystallized from toluene:petroleum ether to yield 2'-hydroxy-2-methyl-5-($\beta$-methoxyethyl) - 6,7 - benzomorphan, M.P. 148° C.

Calc. for $C_{16}H_{24}NO_2$: C, 73.53; H, 8.87; N, 5.36. Found: C, 73.87; H, 8.90; N, 5.23.

Example 3.—2'-methoxy-2-methyl-5-($\beta$-methoxyethyl)-6,7-benzomorphan

By treating a solution of 4.8 g. of 2'-hydroxy-2-methyl-5-($\beta$-methoxyethyl)-6,7-benzomorphan in 50 ml. of 1:1 chloroform:methanol with 100 ml. of a freshly prepared ethereal solution of diazomethane, 250 ml. of which are prepared from 20 g. of N-nitrosomethylurea, stirring the reaction mixture for 15 hours, evaporating the same to dryness and titurating the residue with ether, there is obtained 2' - methoxy - 2 - methyl - 5 - ($\beta$ - methoxyethyl)-6,7-benzomorphan.

Other alkylating agents, such as phenyltrimethyl ammonium chloride may be employed in place of diazomethane.

Example 4.—2'-acetoxy-2-methyl-5-($\beta$-methoxyethyl)-6,7-benzomorphan

A mixture of 1.51 g. of 2'-hydroxy-2-methyl-5-($\beta$-methoxyethyl)-6,7-benzomorphan and 8.4 ml. of acetic anhydride is heated at 100° C. for 45 minutes. The solution is then poured into 20 ml. of cold water and after 5 minutes, an aqueous solution of 50% potassium hydroxide in slight excess is added with cooling. The liberated organic base is shaken quickly into ether and this solution is then dried and evaporated, the residue being recrystallized from isopropyl ether to yield 2'-acetoxy-2-methyl-5-($\beta$-methoxyethyl)-6,7-benzomorphan.

Example 5.—2-methyl-5-($\beta$-hydroxyethyl)-6,7-benzomorphan (a) 2 - methyl - 5 - ($\beta$ - bromoethyl) - 6,7 - benzomorphan hydrobromide.—A solution of 6 g. of 2-methyl-5-($\beta$-methoxyethyl)-6,7-benzomorphan and 50 ml. of 48% hydrobromic acid is refluxed for 30 minutes. The mixture is then cooled, rendered basic with dilute ammonium hydroxide and extracted with chloroform. The chloroform extracts are then concentrated in vacuo and treated with ethanolic hydrogen bromide and ether to form 2-methyl-5-($\beta$-bromoethyl)-6,7-benzomorphan as the hydrobromide.

(b) 2 - methyl - 5 - ($\beta$ - hydroxyethyl) - 6,7 - benzomorphan.—Two grams of sodium hydroxide are added to 2.5 g. of 2-methyl-5-($\beta$-bromoethyl)-6,7-benzomorphan in 50 ml. of 1:1 ethanol:water. The solution is refluxed with stirring for one hour and then concentrated in vacuo. The residue is crystallized from acetone to yield 2-methyl-5-($\beta$-hydroxyethyl)-6,7-benzomorphan.

Example 6.—2-methyl-5-($\beta$-acetoxyethyl)-6,7-benzomorphan

A mixture of 3 g. of 2-methyl-5-($\beta$-hydroxyethyl)-6,7-benzomorphan and 20 ml. of acetic anhydride is heated at 100° C. for one hour and then concentrated in vacuo. The residue is titurated with chloroform and treated with aqueous sodium hydroxide. The chloroform layer is then separated, dried and concentrated to yield 2-methyl-5-($\beta$-acetoxyethyl)-6,7-benzomorphan which may be recrystallized from cyclohexane.

Example 7.—2-methyl-5-($\beta$-ethoxyethyl)-6,7-benzomorphan

To a solution of 2.5 g. of 2-methyl-5-($\beta$-bromoethyl)-6,7-benzomorphan in 50 ml. of absolute ethanol are added 2.5 g. of sodium ethoxide. The solution is refluxed for one hour with stirring, concentrated in vacuo and neutralized with aqueous acid. The neutralized mixture is then extracted with chloroform and these extracts then dried and concentrated in vacuo to yield 2-methyl-5-($\beta$-ethoxyethyl)-6,7-benzomorphan.

Example 8.—2-methyl-5-($\alpha$-hydroxy-$\alpha$-methylethyl)-6,7-benzomorphan

A solution of 3.0 g. of 2-methyl-5-carboethoxy-6,7-benzomorphan in 50 ml. of anhydrous ether is treated with a molar excess of methyl magnesium bromide. The mixture is refluxed for three hours and then rendered acidic by the addition of dilute hydrochloric acid. The aqueous phase is treated with dilute base and extracted with chloroform. The chloroform extracts are concentrated in vacuo and the residue recrystallized from ethyl acetate to yield 2-methyl-5-($\alpha$-hydroxy-$\alpha$-methylethyl)-6,7-benzomorphan.

Example 9.—2-methyl-5-($\alpha,\beta$-dihydroxyethyl)-6,7-benzomorphan (a) 2-methyl-5-acetyl-6,7-benzomorphan.—A solution of 3.8 g. of 2-methyl-5-carboxy-6,7-benzomorphan in 100 ml. of dry tetrahydrofuran is treated with a 10% molar excess of methyl lithium. The mixture is heated at reflux for 1½ hours and concentrated in vacuo. The residue is treated with 10% hydrochloric acid, neutralized with sodium carbonate and extracted with ethyl ether. After drying the ethereal extracts, and concentrating the same, there is obtained 2-methyl-5-acetyl-6,7-benzomorphan which may be recrystallized from benzene.

(b) 2-methyl-5-bromoacetyl-6,7-benzomorphan.—To a gently refluxing solution of 19 g. of 2-methyl-5-acetyl-6,7-benzomorphan hydrobromide in 100 ml. of acetic acid is added over a 15 minute period a solution of 9.5 g. of bromine in 45 ml. of acetic acid. After refluxing for fifteen minutes, the solution is cooled under a stream of nitrogen and 400 ml. of ether are then added gradually. The mixture is allowed to stand overnight in the refrigerator. After collecting the solid by filtration and drying, there is obtained 2-methyl-5-bromoacetyl-6,7-benzomorphan hydrobromide.

(c) 2-methyl - 5 - hydroxyacetyl-6,7-benzomorphan.—A solution of 15 g. of 2-methyl-5-bromoacetyl-6,7-benzomorphan hydrobromide in 100 ml. of 1:1 ethanol:water is treated with 10 g. of sodium hydroxide. The reaction mixture is stirred for one hour and concentrated in vacuo. The residue is treated with water and chloroform and the phases then separated. The chloroform phase is dried and concentrated to yield 2-methyl-5-hydroxyacetyl-6,7-benzomorphan.

(d) 2-methyl - 5 - ($\alpha,O$ - dihydroxyethyl)-6,7-benzomorphan.—A solution of 3 g. of 2-methyl-5-hydroxyacetal-6,7-benzomorphan in 100 ml. of dry tetrahydrofuran is treated with 3 g. of lithium aluminum hydride. The reaction mixture is refluxed for four hours, cooled and cautiously treated under argon with 3.0 ml. of water, 2.2 ml. of 20% aqueous sodium hydroxide solution, and 7.5 ml. of water, in that order. After refluxing for one hour, the mixture is filtered and the filtrate concentrated to dryness and recrystallized from isopropanol to yield 2-methyl-5-($\alpha,\beta$-dihydroxyethyl)-6,7-benzomorphan.

Example 10.—2-methyl-5-(α-hydroxyethyl)-6,7-benzomorphan

Three grams of 2-methyl-5-acetyl-6,7-benzomorphan is treated with 3.0 g. of lithium aluminum hydride in the manner of Example 9(c) to yield 2-methyl-5-(α-hydroxyethyl)-6,7-benzomorphan.

Example 11.—2-methyl-5-(β-hydroxypropyl)-6,7-benzomorphan (a) 2-methyl - 5 - formylmethyl-6,7-benzomorphan.— To a stirred solution of 7.9 g. of 2-methyl-5-(β-hydroxyethyl)-6,7-benzomorphan in 25 ml. of a sulfuric acid: acetic acid:water solution (1:10:2) held at 0°–5° are added 14 ml. of a chromic acid solution (made by dissolving 12.5 g. of chomic oxide in 12.5 ml. of water and diluting to 50 ml. with acetic acid) at a rate of one drop per second. The mixture is heated briefly to discharge the color of chromium trioxide. The reaction mixture is neutralized with ammonium hydroxide solution and extracted with methylene chloride. The methylene chloride extract upon concentration yields 2-methyl-5-formylmethyl-6,7-benzomorphan.

(b) 2-methyl - 5 - (β-hydroxypropyl)-6,7-benzomorphan.—An ethereal solution of 3 g. of 2-methyl-5-formylmethyl-6,7-benzomorphan is treated with a slight molar excess methyl magnesium bromide. The mixture is refluxed for 3 hours and then rendered acidic by the addition of dilute hydrochloric acid. The acidic phase is separated, rendered basic with dilute sodium hydroxide and extracted with ether. These ethereal extracts are then dried and concentrated to yield 2-methyl-5-(β-hydroxypropyl)-6,7-benzomorphan.

Example 12.—2-methyl-5-hydroxymethyl-6,7-benzomorphan

Three grams of 2-methyl-5-carboethoxy-6,7-benzomorphan in 50 ml. of tetrahydrofuran are treated with 3 g. of lithium aluminum hydride in 50 ml. of tetrahydrofuran. The mixture is refluxed for 4 hours and the excess lithium aluminum hydride decomposed by the cautious addition of 3.0 ml. of water, 2.2 ml. of 20% aqueous sodium hydroxide solution, and 7.5 ml. of water, in that order. After refluxing for one hour, the mixture is filtered and the filtrate concentrated to dryness and recrystalized from l isopropanol to yield 2-methyl-5-hydroxymethyl-6,7-benzomorphan.

Example 13.—2-methyl-5-acetoxymethyl-6,7-benzomorphan

By treating 2-methyl-5-hydroxymethyl-6,7-benzomorphan with acetic anhydride in the manner of Example 6, there is obtained 2-methyl-5-acetoxymethyl-6,7-benzomorphan. Similarly by the use of other (lower) alkanoic acid anhydrides such as prioponic acid anhydride, the corresponding 5-alkanoyloxymethyl compounds, such as 2-methyl-5-propionyloxymethyl-6,7-benzomorphan, are obtained.

Example 14.—2-methyl-5-propoxymethyl-6,7 benzomorphan (a) 2-methyl - 5 - bromomethyl-6,7-benzomorphan.— To a slurry of 3.0 g. of lithium aluminum hydride in 50 ml. of dry diethyl ether are added 3.0 g. of 2-methyl-5-carboethoxy-6,7-benzomorphan in 50 ml. of dry diethyl ether. After refluxing for two hours, the mixture is cooled and cautiously treated under argon with 3.0 ml. of water, 2.2 ml. of 20% sodium hydroxide and 7.5 ml. of water, in that order. The mixture is then refluxed for an additional hour and filtered. The filtrate is dried over anhydrous magnesium sulfate, filtered, and next treated with 3.5 g. of phosphorous tribromide. The mixture is allowed to stand overnight at room temperature. After being washed with aqueous sodium bicarbonate followed by water, and dried over magnesium sulfate, the ethereal solution is concentrated in vacuo to yield 2-methyl-5-bromomethyl-6,7-benzomorphan which is recrystallized from benzene:cyclohexane.

(b) 2-methyl - 5 - propoxymethyl - 6,7-benzomorphan.—A solution of 2.8 g. of 2-methyl-5-bromomethyl-6,7-benzomorphan in 100 ml. of anhydrous benzene is treated with a solution of 2.0 g. of sodium in 20 ml. of absolute propanol and refluxed for 2½ hours. Upon cooling, the reaction mixture is washed with 100 ml. of water, dried and concentrated in vacuo. The residue is crystallized from cyclohexane to yield 2-methyl-5-propoxymethyl-6,7-benzomorphan.

Example 15.—2-methyl-5-(δ-hydroxybutyl)-6,7-benzomorphan

A solution of 8.0 g. of 2-methyl-5-(β-bromoethyl)-6,7-benzomorphan in 200 ml. of anhydrous ether containing a trace of iodine is treated with a molar equivalent of magnesium ribbon. The mixture is refluxed for 3-hours, cooled and saturated with ethylene oxide. After standing 2 hours at room temperature, the mixture is treated with 100 ml. of 10% hydrochloric acid. The aqueous phase is separated, neutralized with dilute sodium hydroxide and extracted with ether. These ethereal extracts are then treated with ethanolic hydrogen to congo red and the solid which forms is collected and dried to yield 2-methyl-5-(δ-hydroxybutyl)-6,7-benzomorphan as the hydrochloride.

Example 16.—2′-hydroxy-5-(β-methoxyethyl)-6,7-benzomorphan (a) 2′-acetoxy - 2 - cyano-5-(β-methoxyethyl)-6,7-benzomorphan.—To a solution of 2.59 g. (24.4 m. moles) of cyanogen bromide in 30 ml. of chloroform are added over a 45 minute period at room temperature, 5.91 g. (20.3 mmoles) of 2′-acetoxy-2-methyl-5-(β-methoxyethyl)-6,7-benzomorphan. The mixture is then stirred at reflux for three hours and then concentrated in vacuo. The resulting solid is recrystallized from acetone to yield 2′-acetoxy-2-cyano-5-(β-methoxyethyl) - 6,7 - benzomorphan.

(b) 2′-hydroxy-5-(β-methoxyethyl) - 6,7 - benzomorphan.—To a suspension of 5.6 g. of lithium aluminum hydride in 100 ml. of tetrahydrofuran are added under anhydrous conditions, 5 g. of 2′-acetoxy-2-cyano-5-(β-methoxyethyl)-6,7-benzomorphan dissolved in 100 ml. of tetrahydrofuran, using heat if necessary. The mixture is refluxed for 17 hours and then decomposed by the addition of 29 ml. of saturated sodium chloride solution. This mixture is refluxed for one hour and filtered. The filtrate is concentrated in vacuo and the residue then recrystallized to yield 2′-hydroxy-5-(β-methoxyethyl)-6,7-benzomorphan.

Example 17.—2′-hydroxy-2-allyl-5-(β-methoxyethyl)-6,7-benzomorphan

To a suspension of 4.95 g. of 2′-hydroxy-5-(β-methoxyethyl)-6,7-benzomorphan and 3.02 g. of sodium bicarbonate in 100 ml. of dimethyl formamide are added dropwise with stirring, 2.90 g. (2.07 ml.) of allyl bromide in 50 ml. of dimethyl formamide. The mixture is stirred at reflux for 4 hours, evaporated to dryness and triturated with hot water to obtain a suspension. The suspension is cooled and filtered and the collected solid crystallized from absolute ethanol to yield 2′-hydroxy-2-allyl-5-(β-methoxyethyl)-6,7-benzomorphan.

Example 18.—2′-hydroxy-2-propargyl-5-(β-methoxyethyl)-6,7-benzomorphan

To a suspension of 2.47 g. of 2′-hydroxy-5-(β-methoxyethyl)-6,7-benzomorphan and 1.88 g. of potassium carbonate in 100 ml. of dimethyl formamide, is added dropwise with stirring 1.80 ml. (2.70 g.) of propargyl bromide in 10 ml. of dimethyl formamide at room temperature. The reaction mixture is refluxed and stirred for 14 hours. The mixture is brought to dryness under reduced pressure and the residue triturated with hot water to obtain a suspension. The suspension is cooled and filtered and the solid thus collected, washed with water, dried and recrystallized from absolute ethanol to yield 2'-hydroxy-5-(β-methoxyethyl)-2-propargyl-6,7-benzomorphan.

Example 19.—2'-hydroxy-2-(3-methyl-2-butenyl)-5-(β-methoxyethyl)-6,7-benzomorphan A mixture of 8.1 g. of 2'-hydroxy-5-(β-methoxyethyl)-6,7-benzomorphan, 6.0 g. of 1-bromo-3-methyl-2-butene, 5.0 g. of sodium bicarbonate and 125 ml. of N,N-dimethylformamide is heated at reflux with stirring for four hours. The solvent is then removed in vacuo and the residue treated in the manner described in Example 17 to yield 2'-hydroxy-2-(3-methyl-2-butenyl)-5-(β-methoxyethyl)-6,7-benzomorphan.

Example 20.—2'-hydroxy-2-(3-chloro-2-propenyl)-5-(β-methoxyethyl)-6,7-benzomorphan A mixture of 8.1 g. of 2'-hydroxy-5-(β-methoxyethyl)-6,7-benzomorphan, 4.4 g. of cis-1,3-dichloro-1-propene, 3.0 g. of sodium bicarbonate and 125 ml. of N,N-dimethylformamide is stirred at reflux for five hours. The solvent is then removed in vacuo. The residue is triturated with 100 ml. of chloroform and 50 ml. of water. The chloroform layer is washed with 20 ml. of water, dried over anhydrous sodium sulfate and evaporated to dryness. The residue is then crystallized from absolute ethanol to yield cis-2'-hydroxy-2-(3-chloro - 2 - propenyl)-5-(β-methoxyethyl)-6,7-benzomorphan, which is further purified by recrystallization from absolute ethanol. In a similar fashion by use of 1,3,3-trichloro-2-propene; 1,3-dichloro-2-butene; 1,2-dibromo-2-propene; 1,4-dibromo-2-butene; 1,1,3-tribromo-1-propene; 1,3-dibromo-1-propene; 1,2,3-trichloro-1-propene; 1,2-dichloro-2-propene and 1,1,2,3-tetrachloro-1-propene, there is obtained 2'-hydroxy-2-(3,3-dichloro - 2 - propenyl)-5-(β-methoxyethyl) - 6,7 - benzomorphan; 2'-hydroxy-2-(3-chloro-2-butenyl)-5-(β-methoxyethyl)-6,7-benzomorphan; 2'-hydroxy-2-(2-bromo - 2 - propenyl)-5-(β-methoxyethyl)-6,7-benzomorphan; 2'-hydroxy - 2 - (4-bromo-2-butenyl)-5-(β-methoxyethyl)-6,7-benzomorphan; 2'-hydroxy-2-(3,3-dibromo-2-propenyl)-5-(β-methoxyethyl) - 6,7 - benzomorphan; 2'-hydroxy - 2 - (3-bromo-2-propenyl)-5-(β-methoxyethyl) - 6,7 - benzomorphan; 2'-hydroxy-2-(3-dichloro - 2 - propenyl)-5-(β-methoxyethyl)-6,7-benzomorphan; 2'-hydroxy-2-(2-chloro - 2 - propenyl)-5-(β-methoxyethyl)-6,7-benzomorphan and 2'-hydroxy-2-(2,3,3-trichloro-2-propenyl) - 5 - (β-methoxyethyl)-6,7-benzomorphan.

Likewise, by using trans-1,3-dichloro-1-propene there is obtained trans-2'-hydroxy-2-(3-chloro-2-propenyl)-5-(β-methoxyethyl)-6,7-benzomorphan.

Example 21.—2'-hydroxy-2-(β-phenylethyl)-5-(β-methoxyethyl)-6,7-benzomorphan

A mixture of 1.86 g. of 2'-hydroxy-5-(β-methoxyethyl)-6,7-benzomorphan, 0.76 g. of sodium bicarbonate, 1.74 g. of freshly distilled β-phenethyl bromide and 50 ml. of dimethyl formamide are heated at an oil bath temperature of 145° for 4 hours and then stirred overnight at room temperature. The mixture is concentrated in vacuo and the residue washed with 100 ml. of water and dried to yield 2' - hydroxy-2-(β-phenylethyl)-5-(β-methoxyethyl)-6,7-benzomorphan.

In a similar fashion, by using an equivalent amount of pentyl bromide in place of β-phenethyl bromide, there is obtained 2'-hydroxy-2-n-pentyl-5-(β-methoxyethyl)-6,7-benzomorphan.

By substituting 2'-hydroxy-5-(α,β-dihydroxyethyl)-6,7-benzomorphan for 2'-hydroxy-5-(β-methoxyethyl)-6,7-benzomorphan in the above alternative procedure, there is obtained 2'-hydroxy-2-(β-phenethyl)-5-(α,β-dihydroxyethyl)-6,7-benzomorphan.

Example 22.—2'-hydroxy-2-β-(4-aminophenethyl)-5-(β-methoxyethyl)-6,7-benzomorphan A mixture of 11.2 g. of 2'-hydroxy-5-(β-methoxyethyl)-6,7-benzomorphan, 12 g. of 2-(4-nitrophenyl)-ethyl bromide and 8 g. of potassium carbonate in 180 ml. of dimethylformamide is stirred at 95–99° C. for from four to eight hours. The cooled mixture is evaporated and triturated with water or is poured into 1 l. of water and extracted into ethyl acetate. Evaporation of the extract yields 2' - hydroxy-2-β-(4-nitrophenethyl)-5-(β-methoxyethyl)-6,7-benzomorphan.

A suspension of 4.5 g. of 2'-hydroxy-2-β-(4-nitrophenethyl)-5-(β-methoxyethyl)-6,7-benzomorphan and 3 g. of 10% palladium-on-charcoal in 200 ml. of ethanol is hydrogenated in a Parr apparatus under a pressure of 40 lbs./in.$^2$. When the theoretical amount of hydrogen is absorbed, the catalyst is removed by filtration and the filtrate evaporated to dryness. The residue thus obtained, 2' - hydroxy-2-β-(4-aminophenethyl)-5-(β-methoxyethyl)-6,7-benzomorphan, is recrystallized from methanol.

Example 23.—2'-hydroxy-2-cyclopropylmethyl-5-(β-methoxyethyl)-6,7-benzomorphan

To a solution of 4.94 g. of 2'-hydroxy-5-(β-methoxyethyl)-6,7-benzomorphan in 100 ml. of pyridine, are added through a dropping funnel with stirring 5.02 g. (5.11 ml.) of cyclopropane carboxylic acid chloride in 10 ml. of toluene. The mixture is stirred at reflux for 2½ hours and then evaporated to dryness. The residue is triturated with 100 ml. of 1 N hydrochloric acid and 150 ml. of chloroform. The chloroform layer is washed with water, clarified with charcoal, dried over anhydrous sodium sulfate and brought to dryness to yield 2'-hydroxy-2-cyclopropylcarboxy - 5 - (β-methoxyethyl) - 6,7 - benzomorphan. This material is dissolved in 50 ml. of tetrahydrofuran and added to a suspension of 3.0 g. of lithium aluminum hydride in 50 ml. of tetrahydrofuran with stirring over a period of 15 minutes. The reaction mixture is stirred at reflux for 15 hours. The excess of lithium aluminum hydride is then decomposed by the addition of 30 ml. of ethyl acetate followed by 50 ml. of water. About 100 g. of anhydrous sodium sulfate are then added to the mixture with heating and stirring to obtain a granular precipitate. The precipitate is collected by filtration and washed three times with 20 ml. portions of hot tertahydrofuran. The filtrate is combined with the washings and evaporated to dryness. The residue is next treated with 50 ml. of aqueous ammonium hydroxide and chloroform. The chloroform layer is separated, washed with water, dried over anhydrous sodium sulfate and evaporated to dryness. The residue is crystallized from chloroform and then n-butanol to yield 2'-hydroxy-2-cyclopropylmethyl-5-(β-methoxyethyl)-6,7-benzomorphan.

The free base is converted into hydrochloride salt by treatment with alcoholic hydrogen chloride and crystallization from acetone.

In a similar fashion, from equivalent amounts of β-methoxypropionyl chloride and β-chloropropionyl chloride, there are respectively obtained according to the procedure of this example, 2'-hydroxy-2-(γ-methoxypropyl)-5-(β-methoxyethyl)-6,7-benzomorphan and 2'-hydroxy-2-(γ-chloropropyl) - 5 - (β-methoxyethyl)-6,7-benzomorphan. Alternatively, 2' - hydroxy-2-(γ-chloropropyl)-5-(β-methoxyethyl)-6,7-benzomorphan may be obtained by the action of 3-chloropropyl bromide on 2'-hydroxy-5-(β-methoxyethyl)-6,7-benzomorphan in the manner of Example 21.

Example 24.—2'-hydroxy-2-(3-methylaminopropyl)-5-(β-methoxyethyl)-6,7-benzomorphan Ten grams of 2'-hydroxy-2-(γ-chloropropyl)-5-(β-methoxyethyl)-6,7-benzomorphan in a large molar excess of liquid methylamine are heated in a pressure vessel at 80° C. for eight hours. At the end of this time, the mixture is cooled and the unreacted methylamine removed by evaporation. The residue is recrystallized from acetone to yield 2'-hydroxy-2-(3-methylaminopropyl)-5-(β-methoxyethyl)-6,7-benzomorphan in a large molar excess of liquid methylamine are heated in a pressure vessel at 80° C. for eight hours. At the end of this time, the mixture is cooled and the unreacted methylamine removed by evaporation. The residue is recrystallized from acetone to yield 2'-hydroxy-2-(3-methylaminopropyl)-5-(β-methoxyethyl)-6,7-benzomorphan.

Treatment of an acetone solution of this product with anhydrous hydrogen chloride causes precipitation of the dihydrochloride salt.

By employing other amines such as ammonia, diethylamine and the like in the procedure of this example, the corresponding N-substituted 3-aminopropyl compounds are obtained.

Example 25.—2'-acetoxy-2-(β-hydroxyethyl)-5-(β-methoxyethyl)-6,7-benzomorphan

Two grams of 2'-acetoxy-5-(β-methoxyethyl)-6,7-benzomorphan are dissolved in sufficient absolute ethanol and the solution saturated with ethylene oxide. The saturated solution is permitted to stand for 15 hours at 25° C. and then evaporated in vacuo. The solid residue is recrystallized from acetone to yield 2'-acetoxy-2-(β-hydroxyethyl)-5-(β-methoxyethyl)-6,7-benzomorphan.

By treatment of this product with acetic anhydride, there is obtained 2'-acetoxy-2-(β-acetoxyethyl)-5-(β-methoxyethyl)-6,7-benzomorphan.

In a similar fashion, 2'-methoxy-5-(β-methoxyethyl)-6,7-benzomorphan is treated with ethylene oxide to yield 2'-methoxy-2-(β-hydroxyethyl)-5-(β-methoxyethyl)-6,7-benzomorphan.

Example 26.—2,9-dimethyl-2'-hydroxy-5-(β-methoxyethyl)-6,7-benzomorphan methanesulfonate (a) 3-methyl-4-(β-methoxyethyl)pyridine.—Freshly distilled 3-methyl-4-vinylpyridine (20 g.) is added to a solution of 3 g. of sodium in 250 ml. of absolute methanol. The mixture is refluxed for 15 hours, acidified with hydrochloric acid, and evaporated to dryness. The residue is then shaken with ether and an excess of sodium hydroxide solution and the ethereal extracts dried over sodium sulfate and distilled in vacuo. The distillate is extracted with ether and an aqueous sodium hydrogen sulfate solution and again dried and distilled.

(b) 3-methyl-4-(β-methoxyethyl)pyridine methiodide.—Methyl iodide (2.20 mole) is added dropwise with stirring to a solution of 2.00 moles of 3-methyl-4-(β-methoxyethyl)pyridine in 400 ml. of acetone and 200 ml. of benzene at such a rate that reflux is maintained. The stirring is continued for 3 hours while the reaction mixture is allowed to cool to room temperature. After refrigeration the product is collected.

(c) 1,3-dimethyl-4-(β-methoxyethyl)-1,2,5,6-tetrahydropyridine.—A solution of 0.4 mole of 3-methyl-4-(β-methoxyethyl)pyridine methiodide in 100 ml. of water and 100 ml. of methanol is added dropwise with stirring to a solution of 0.7 mole of sodium borohydride in 100 ml. of water at such a rate that the temperature is maintained at 50–60° (2 hours required). Additional sodium borohydride (0.6 mole) is then added and stirring at room temperature is continued overnight. The solution is filtered and concentrated in vacuo to about one-third its volume. The solution is next extracted several times with ether. The ether extracts are washed with saturated aqueous sodium sulfate, dried, and evaporated, and the residue distilled to yield the product.

(d) 1,3-dimethyl-1-(p-methoxybenzyl)-4-(β-methoxyethyl)-1,2,5,6-tetrahydropyridinium chloride.—The quaternary salt is prepared by the addition of a 10% mole excess of p-methoxybenzylchloride to a solution of 8.0 g. of 1,3-dimethyl-4-(β-methoxyethyl)-1,2,5,6-tetrahydropyridine in 40 ml. of benzene. After stirring at room temperature, the product crystallizes and is collected.

(e) 1,3-dimethyl-2-(p-methoxybenzyl)-4-(β-methoxyethyl)-1,2,5,6-tetrahydropyridine.—One hundred milliliters of a 2.10 molar solution of phenyl lithium in ether is added dropwise to a rapidly stirred suspension of 1,3-dimethyl-1-(p-methoxybenzyl)-4-(β-methoxyethyl)-1,2,5,6-tetrahydropyridinium chloride (0.19 mole) in 200 ml. of anhydrous ether. The mixture is refluxed for 2 hours and then cooled and rendered acidic with 150 ml. of 2 N hydrochloric acid. The aqueous layer is separated and rendered basic with conc. ammonium hydroxide with ice cooling. The product is extracted into ether, dried, concentrated, and distilled in vacuo.

(f) 2'-hydroxy-2,9-dimethyl-5-(β-methoxyethyl)-6,7-benzomorphan methanesulfonate.—A solution of the soluble portion of 10.0 g. of aluminum tribromide in 25 ml. of carbon disulfide is added over a 10 minute interval to a mixture of 3.0 g. of 1,3-dimethyl-2-(p-methoxybenzyl)-4-(β-methoxyethyl)-1,2,5,6-tetrahydropyridine hydrochloride in 20 ml. of carbon disulfide with stirring and cooling in ice. The cooling bath is removed and the mixture heated at reflux for 30 minutes. The mixture is then cooled, the solution decanted and the residue washed with carbon disulfide. The residue is then poured over ice and 20 ml. of conc. aqueous ammonia are added. Chloroform is added and the mixture stirred and heated to melt the ice and warm the mixture. The solids are filtered off and washed well with chloroform. After drying and evaporating the chloroform the residue is distilled in vacuo yielding 2'-methoxy-2,9-dimethyl-5-(β-methoxyethyl)-6,7-benzomorphan.

When 1.0 g. of this material is treated with 15 ml. of 48% hydrobromic acid at 150° for 12 minutes the 2'-methoxy is selectively cleaved to yield 2'-hydroxy-2,9-dimethyl-5-(β-methoxyethyl)-6,7-benzomorphan on neutralization of the reaction mixture with dilute ammonium hydroxide solution. The material isolated is treated with sulfonic acid until acid to congo red indicator, ether is added and the salt isolated by filtration.

What is claimed is:

1. A compound selected from the group consisting of 6,7-benzomorphans substituted in the 5-position and the non-toxic physiologically acceptable acid addition salts thereof, the 6,7-benzomorphans being of the formula:

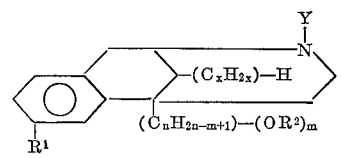

wherein
$n$ has a value of from 1 to 6;
$m$ has a value of from 1 to 2;
$x$ has a value of from 0 to 6;
$R^1$ is a member selected from the group consisting of hydrogen and —O—$R^3$;
each of $R^2$ and $R^3$ is independently a member selected from the group consisting of (lower)alkanoyl and —($C_pH_{2p}$)—H in which $p$ has a value of from 0 to 6;
Y is a member selected from the group consisting of hydrogen, (lower)alkyl, (lower)alkenyl, halo(lower)alkenyl, (lower)alkynyl, and Z-(lower)-alkylene in which Z is selected from the group consisting of:
hydroxy, amino, (lower)alkanyloxy, cycloalkyl of three to five carbon atoms, phenyl, halophenyl, aminophenyl, nitrophenyl, (lower)alkoxyphenyl and hydroxyphenyl.

2. A compound of the formula:

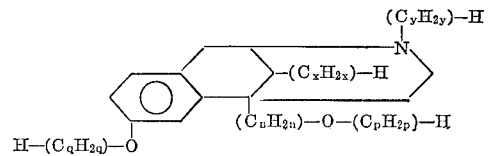

wherein n has a value of from 1 to 6 and
each of *p, q, x* and *y* independently has a value of from 0 to 6.

3. A compound of the formula:

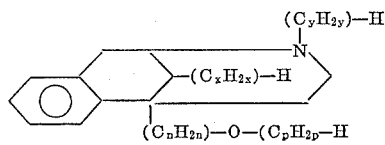

wherein

*n* has a value of from 1 to 6 and
each of *p, x* and *y* independently has a value of from 0 to 6.

4. A compound of the formula

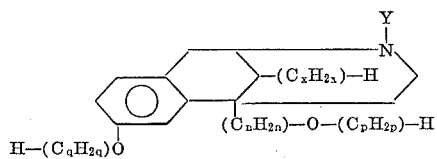

wherein

Y is halo(lower)alkenyl
*n* has a value of from 1 to 6 and
each of *p, q* and *x* independently has a value of from 0 to 6.

5. A comopund of the formula:

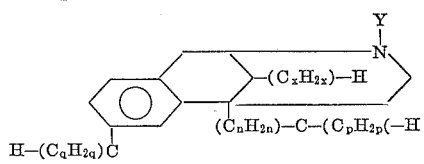

wherein

Y is (lower)alkynyl
*n* has a value of from 1 to 6 and
each of *p, q* and *x* independently has a value of from 0 to 6.

6. A compound of the formula:

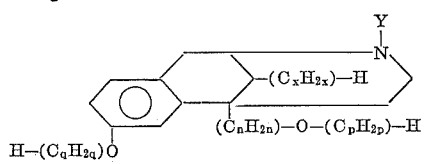

wherein

Y is (lower)alkenyl
*n* has a value of from 1 to 6 and
each of *p, q* and *x* independently has a value of from 0 to 6.

7. A compound of the formula:

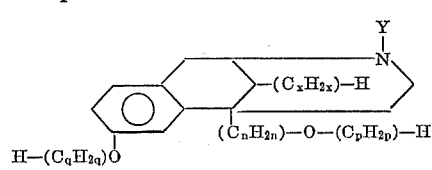

wherein

Y is phenyl(lower)alkyl
*n* has a value of from 1 to 6 and
each of *p, q* and *x* independently has a value of from 0 to 6.

8. A compound of the formula:

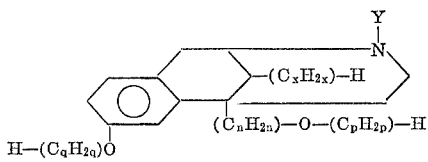

wherein

Y is cyclopropyl(lower)alkyl
*n* has a value of from 1 to 6 and
each of *p, q* and *x* independently has a value of from 0 to 6.

9. A compound in accordance with claim 1, which is 2-methyl-5-($\beta$-methoxyethyl)-6,7-benzomorphan.

10. A compound in accordance with claim 1, which is 2'-hydroxy-2-methyl-5-($\beta$ - methoxyethyl) - 6,7 - benzomorphan.

11. A compound in accordance with claim 1, which is 2'-methoxy-2-methyl-5-($\beta$ - methoxyethyl) - 6,7 - benzomorphan.

12. A compound in accordance with claim 1, which is 2-methyl-5-($\beta$-hydroxyethyl)-6,7-benzomorphan.

13. A compound in accordance with claim 1, which is 2-methyl-5-($\beta$-acetoxyethyl)-6,7-benzomorphan.

14. A compound in accordance with claim 1, which is 2-methyl-5-($\beta$-ethoxyethyl)-6,7-benzomorphan.

15. A compound in accordance with claim 1, which is 2-methyl-5-($\alpha$-hydroxy-$\alpha$ - methylethyl) - 6,7 - benzomorphan.

16. A compound in accordance with claim 1, which is 2-methyl-5-($\alpha,\beta$-dihydroxyethyl)-6,7-benzomorphan.

17. A compound in accordance with claim 1, which is 2'-hydroxy-2-allyl-5-($\beta$-methoxyethyl)-6,7-benzomorphan.

18. A compound in accordance with claim 1, which is 2'-hydroxy-2-propargyl-5-($\beta$-methoxyethyl) - 6,7 - benzomorphan.

19. A compound in accordance with claim 1, which is 2'-hydroxy-2-(3-methyl-2-butenyl)-5-($\beta$ - methoxyethyl)-6,7-benzomorphan.

20. A compound in accordance with claim 1, which is 2'-hydroxy-2-(3-chloro-2-propenyl)-5-($\beta$ - methoxyethyl)-6,7-benzomorphan.

21. A compound in accordance with claim 1, which is 2'-hydroxy-2-($\beta$-phenylethyl)-5-($\beta$ - methoxyethyl) - 6,7-benzomorphan.

22. A compound in accordance with claim 1, which is 2'-hydroxy-2-cyclopropylmethyl - 5 - ($\beta$ - methoxyethyl)-6,7-benzomorphan.

23. A compound in accordance with claim 1, which is 2'-hydroxy-5-($\beta$-methoxyethyl)-2,9-dimethyl - 6,7 - benzomorphan.

24. A compound in accordance with claim 1, which is 2-methyl-5-($\beta$-hydroxypropyl)-6,7-benzomorphan.

References Cited

Kugits et al.: Chem. Pharm. Bull., vol. 1, No. 10, 1166–71 (1964).

HENRY R. JILES, Primary Examiner

G. THOMAS TODD, Assistant Examiner

U.S. Cl. X.R.

260—293.4, 294, 294.7, 297, 999